(12) United States Patent
Krimmel

(10) Patent No.: US 7,903,971 B2
(45) Date of Patent: Mar. 8, 2011

(54) METHOD OF OPERATING A PASSIVE OPTICAL NETWORK

(75) Inventor: Heinz-Georg Krimmel, Korntal-Münchingen (DE)

(73) Assignee: Alcatel Lucent, Paris (FR)

( * ) Notice: Subject to any disclaimer, the term of this patent is extended or adjusted under 35 U.S.C. 154(b) by 1242 days.

(21) Appl. No.: 11/390,313

(22) Filed: Mar. 28, 2006

(65) Prior Publication Data

US 2006/0222362 A1 Oct. 5, 2006

(30) Foreign Application Priority Data

Apr. 4, 2005 (EP) .................................. 05290737

(51) Int. Cl.
*H04B 10/20* (2006.01)
(52) U.S. Cl. ................................ 398/63; 398/76; 398/91
(58) Field of Classification Search .................... 398/63, 398/76, 91
See application file for complete search history.

(56) References Cited

U.S. PATENT DOCUMENTS

| | | | | | |
|---|---|---|---|---|---|
| 5,062,152 | A | * | 10/1991 | Faulkner | 398/190 |
| 5,920,416 | A | * | 7/1999 | Beylat et al. | 398/185 |
| 6,763,193 | B1 | * | 7/2004 | Chand et al. | 398/76 |
| 2002/0172216 | A1 | * | 11/2002 | Asashiba et al. | 370/442 |
| 2003/0011835 | A1 | * | 1/2003 | Elbers et al. | 359/110 |
| 2003/0011854 | A1 | * | 1/2003 | Kahn et al. | 359/173 |
| 2004/0057733 | A1 | * | 3/2004 | Azadet et al. | 398/183 |
| 2005/0180575 | A1 | * | 8/2005 | Maeda et al. | 380/278 |

* cited by examiner

*Primary Examiner* — Dzung D Tran
(74) *Attorney, Agent, or Firm* — Harness, Dickey & Pierce

(57) ABSTRACT

The invention relates to a method of operating a passive optical network. The passive optical network comprises an optical line termination being connected via optical fibers to a number of network terminations. The method comprises the step of generating an optical signal to be transmitted on one of the optical fibers comprising a number of signal states. The method is characterized in that the number of signal states is changed.

20 Claims, 2 Drawing Sheets

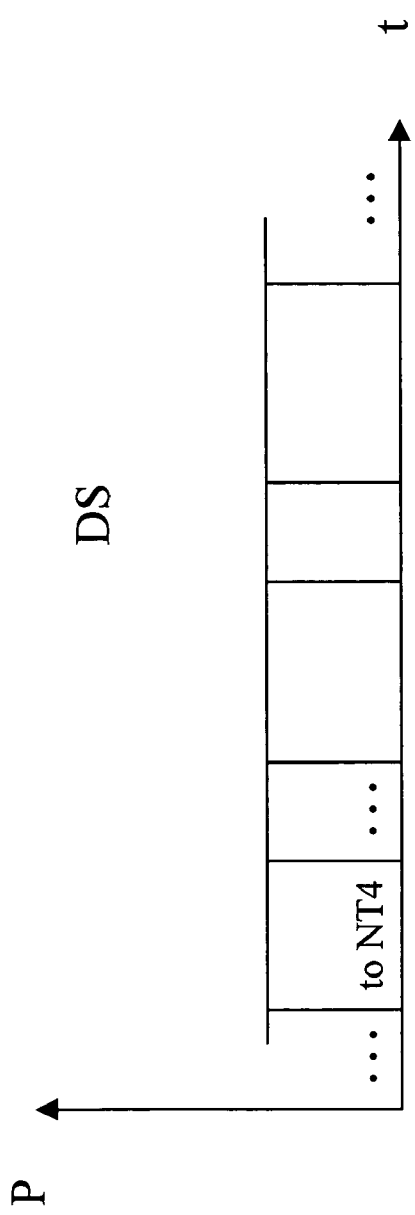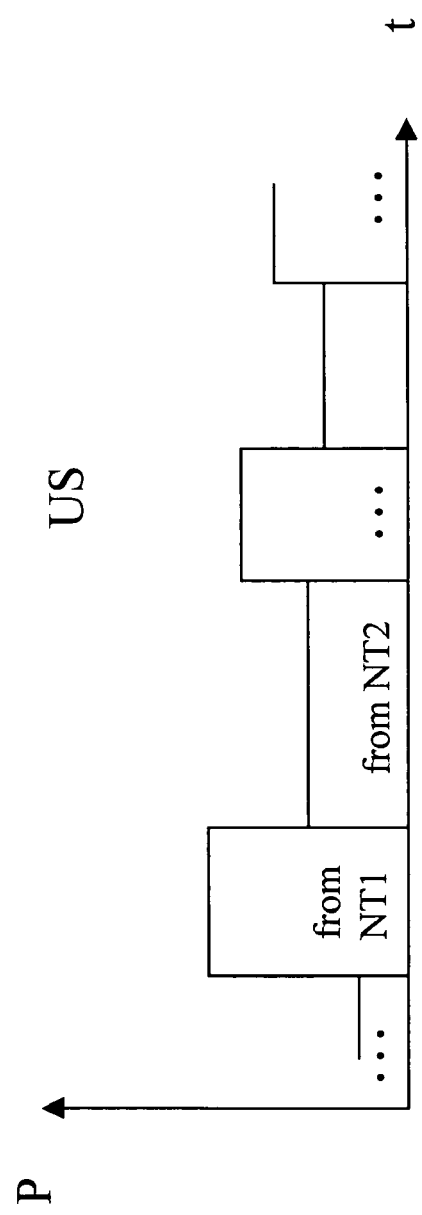

METHOD OF OPERATING A PASSIVE OPTICAL NETWORK

BACKGROUND OF THE INVENTION

The invention is based on a priority application EP05290737.5 which is hereby incorporated by reference.

The invention relates to a method of operating a passive optical network comprising an optical line termination being connected via optical fibers to a number of network terminations and comprising the step of generating an optical signal to be transmitted on one of the optical fibers comprising a number of signal states. The invention also relates to a corresponding passive optical network, to a corresponding optical line termination and to a corresponding network termination.

It is known to define the transmission rate within a passive optical network to a pre-defined value. Under this condition, all network terminations are able to communicate with the optical line termination.

In order to incorporate network terminations in the passive optical network that have a higher transmission rate, it is known to use several different transmission rates at least in the upstream direction. In this case, the optical line termination must be adapted to all of the used transmission rates. In order to use several transmission rates in the downstream direction, the receivers of the network terminations would have to be adapted.

However, the transmission qualities of the links between the optical line termination and the network terminations may be different or may even change from time to time. For example, changes within the passive optical fiber network may have the consequence that a specific transmission path includes an additional splitter with the result that the transmission quality of the link is reduced.

The known methods do not consider such changes of the transmission quality.

SUMMARY OF THE INVENTION

It is an object of the invention to provide a method of operating a passive optical network that is capable to consider changes of the transmission quality of a link.

Based on a method as outlined above, the invention solves this object by the step of changing the number of signal states.

On one hand, if the transmission quality of the link proves to be better, it is possible to increase the number of signal states of the optical signal. Due to the better transmission quality, the optical line termination and/or the corresponding network termination is able to distinguish this increased number of signal states correctly within a received optical signal.

On the other hand, if the transmission quality of the link proves to be worse, the number of signal states is decreased so that it is easier for the optical line termination and/or the corresponding network termination to recognize the correct signal state within the received optical signal As a result, the number of signal states of the optical signal may be adapted based on the transmission quality of the link.

An increase of the number of signal states, however, represents an increase of the transmission rate. Therefore, the invention provides an adaptation of the transmission rate depending on the transmission quality of the link.

In an advantageous embodiment, a first number of signal states is two (2) and a second number of signal states is greater than two (2). Alternatively, it is possible that both, a first and a second number of signal states are greater than two (2), but both are different from each other.

In a further advantageous embodiment, it is not only possible to change between a first and a second number of signal states, but between several different numbers of signal states, for example between two (2) and four (4) and eight (8) and sixteen (16) signal states.

In an advantageous embodiment of the invention, the number of signal states depends on the power of the received optical signal. For example, the optical line termination analyzes the received optical signal of a specific frame with regard to its power and then evaluates a corresponding number of signal states. If the received power is high, the number of signal states may also be high. This is a simple but effective method to define the number of signal states.

It is advantageous, if the number of signal states is defined for any one of the network terminations. This allows to adopt the transmission rate of any one of the network terminations separately.

In a further advantageous embodiment of the invention, the optical power of the optical signal received at the optical line termination is evaluated for a specific frame, the number of signal states is defined based on the evaluated optical power, and the defined number of signal states is assigned to that network termination from which the received frame was sent.

Advantageously, that network termination from which the received frame was sent, is informed about the defined number of signal states.

Further features, applications and advantages of the invention will become apparent from the following description of exemplary embodiments of the invention that are shown in the drawings. There, all described and shown features, separately or in any combination, represent the subject matter of the invention, independently of the wording of these features in the description and independently of the combination of these features in the claims or of the dependencies of the claims.

BRIEF DESCRIPTION OF THE DRAWINGS

FIGS. 2a and 2b show schematic diagrams of signals within the passive optical network of FIG. 1.

In FIG. 1, a passive optical network PON is shown. On the side of the network provider, the passive optical network PON provides an optical line termination OLT. On the customer side of the link, the passive optical network PON provides a number of network terminations NT1, NT2, NT3, NT4, NT5.

DETAILED DESCRIPTIONS OF THE DRAWINGS

Figure 1:
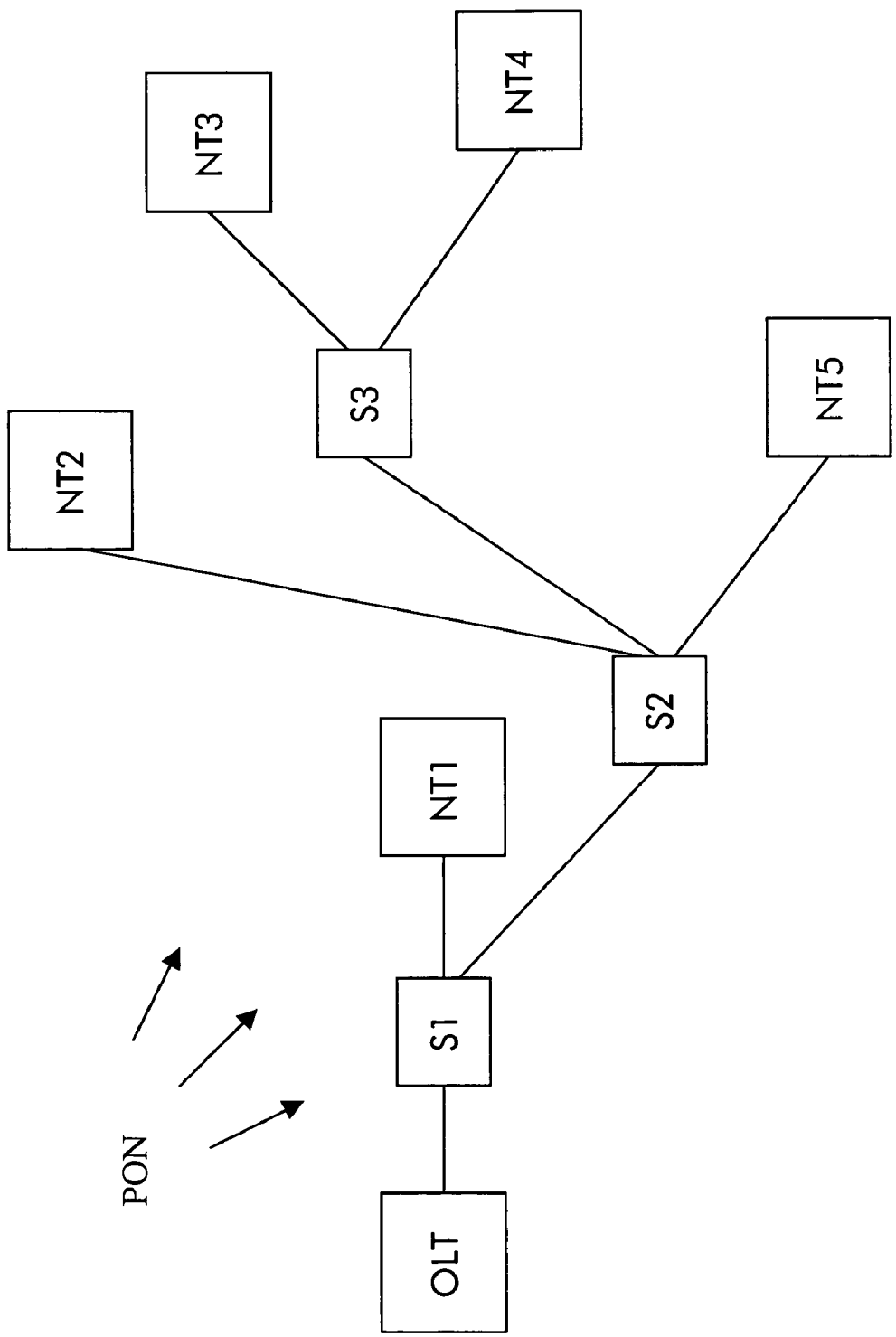
FIG. 1 shows a schematic block diagram of an embodiment of a passive optical network according to the invention.

According to FIG. 1, the optical line termination OLT is connected with the first network termination NT1 by optical fibers via a first optical splitter S1. The first optical splitter S1 is connected by an optical fiber with a second optical splitter S2 which, in turn, is connected by an optical fiber with a third optical splitter S3. The second and the fifth network termination NT2, NT5, are connected with the second optical splitter S2 and the third and the fourth network termination NT3, NT4 are connected with the third optical splitter S3.

The transmission direction from the optical line termination OLT to the network terminations NT1, NT2, NT3, NT4, NT5 is called downstream. The opposite direction, i.e. the direction from the network terminations NT1, NT2, NT3, NT4, NT5 to the optical line termination OLT is called upstream.

The optical paths may be realized on a single fiber for combined upstream and downstream direction; however, multiple fiber paths may also be present.

The optical line termination OLT comprises a device for transmitting and receiving optical signals via the connected optical fiber. Furthermore, the optical line termination OLT comprises a device for analyzing received optical signals and for generating signal states for the upstream direction. These signal states will be explained later.

Any one of the network terminations NT1, NT2, NT3, NT4, NT5 comprises a device for transmitting and receiving optical signals. Any one of the optical splitters S1, S2, S3 is designed to forward optical signals received at one of the connected optical fibers of one side to the connected optical fibers of the other side, and vice versa.

The data to be transmitted in the downstream direction is encapsulated in frames. Any one of the frames comprises a destination address. The optical line termination OLT sends these frames one after the other with the corresponding destination addresses. All network terminations NT1, NT2, NT3, NT4, NT5 receive all frames. Each one of the network terminations NT1, NT2, NT3, NT4, NT5 examines the destination address of a received frame. If a respective frame is addressed to one of the network terminations NT1, NT2, NT3, NT4, NT5, then this specific network termination, e.g. NT2, stores the received frame for further processing.

The data to be transmitted in the upstream direction is also encapsulated. However, each one of the network terminations NT1, NT2, NT3, NT4, NT5 is only allowed to send data within allocated time frames. The optical line termination OLT, therefore, receives a sequence of frames from the different network terminations NT1, NT2, NT3, NT4, NT5.

As all frames transmitted in the downstream direction are generated by the same optical line termination OLT, the transmitted intensities of the corresponding optical signals are also the same. This is shown in FIG. 2a.

FIG. 2a shows a diagram of the transmitted optical power P at the output of the optical line termination OLT over the time t. In FIG. 2a, a sequence of frames is transmitted by the optical line termination OLT in the downstream direction "DS". As can be seen, all frames have the same power P.

In contrast thereto, all frames received in the upstream direction by the optical line termination OLT, are generated by different network terminations NT1, NT2, NT3, NT4, NT5. The frames from the different network terminations NT1, NT2, NT3, NT4, NT5 are transmitted via different paths through the passive optical network PON. The number of optical splitters and the length of the optical fibers being passed, therefore, are also different for the different frames.

As a result, the optical signals corresponding to the different frames received in the upstream direction by the optical line termination OLT generally have different intensities. This is shown in FIG. 2b.

FIG. 2b shows a diagram of the received optical power P at the input of the optical line termination OLT over the time t. In FIG. 2b, a sequence of frames is received by the optical line termination OLT in the upstream direction "US". As can be seen, the frames have different powers P.

Each frame is built up of symbols. In connection with all frames being transmitted in upstream or in downstream direction, a maximum symbol rate or Baud rate is pre-defined. For example, this rate is 1.244, 16 Mbaud. This pre-defined rate remains constant.

The optical line termination OLT analyzes the received frames from the different network terminations NT1, NT2, NT3, NT4, NT5 and evaluates the received optical signals within each of the corresponding frames. This evaluation may be directed to the optical power P of the received signals; however, the evaluation may alternatively or in addition comprise evaluations of the error rate and/or the error ratio and/or the eye opening or the like of the received optical signals.

Based on the evaluation, the optical line termination OLT defines a signaling mode for each of the received frames. This signaling mode comprises a specific number of signal states wherein each of the signal states is defined by a different optical power or a different optical intensity or the like. Then, the optical line termination OLT assigns this signaling mode, i.e. the corresponding number of signal states, to the upstream direction of that network terminations NT1, NT2, NT3, NT4, NT5 from which the frame was sent.

If the optical signal of a received frame coming from e.g. the network termination NT1 has a high optical power P and enough margin of the transmission link quality, then the optical line termination OLT defines a signaling mode with e.g. a number of 16 signal states in connection with the network termination NT1. However, if the optical signal of a received frame coming from e.g. the network termination NT4 has a low optical power P, then the optical line termination OLT defines a signaling mode with e.g. a number of 2 signal states in connection with the network termination NT4. Other signaling modes may have other numbers of signal states, e.g. 8 and/or 4 for received optical powers P that are in between a high received power P and a low received power P.

A number of 16 signal states means that the optical signal received from the respective network termination, e.g. the network termination NT1, may have 16 different values, wherein each of these values corresponds to a different binary value. Based on these 16 different signal states, therefore, it is possible to encode 4 binary digits in each transmitted symbol.

However, if there is only a number of 2 signal states, then the optical signal received from the respective network termination, e.g. from the network termination NT4, may only represent 2 different values. Based on these 2 different signal states, therefore, it is possible to encode only 1 binary digit in each transmitted symbol.

Having 8 signal states, 3 binary digits can be encoded per symbol, and having 4 signal states, 2 binary digits can be encoded per symbol.

As a consequence, if the symbol rate is e.g. 1.244, 16 Mbaud, and if the number of the signal states in connection with a specific network termination is 16, then the transmission rate from and to this network termination is 4×1.244, 16 Mbits/sec. If the number of signal states is 8, then the transmission rate is 3×1.244, 16 Mbits/sec, if the number of signal states is 4, then the transmission rate is 2×1.244, 16 Mbits/sec, and if the number of signal states is 2, then the transmission rate is 1.244, 16 Mbits/sec which corresponds to the symbol rate of 1.244, 16 Mbaud.

The optical line termination OLT then informs the respective network termination about the evaluated signaling mode, i.e. about the evaluated number of signal states. Then, the subsequent transmissions between the respective network termination and the optical line termination OLT in the upstream direction are carried out using the defined number of signal states.

This procedure is carried out for all network terminations NT1, NT2, NT3, NT4, NT5. As well, this procedure is repeated consecutively or from time to time for all network terminations NT1, NT2, NT3, NT4, NT5.

As a result, the transmission between any one of the network terminations NT1, NT2, NT3, NT4, NT5 and the optical line termination OLT in the upstream direction is always adapted to the actual quality of the optical signal received by the optical line termination OLT. E.g. based on the received power P and/or other quality criteria, the signaling mode for the respective network terminations NT1, NT2, NT3, NT4, NT5 is evaluated and adjusted, if necessary. The transmission rate between the optical line termination OLT and the network terminations NT1, NT2, NT3, NT4, NT5 is thereby permanently optimized.

Alternatively or in addition, it is possible to implement a similar scenario in the downstream direction. In this case, one or more of the network terminations NT1, NT2, NT3, NT4, NT5 are adapted to analyze the frames received from the optical line termination OLT with regard to the optical power of the received optical signals or with regard to other criteria like the error rate and/or the error ratio and/or the eye opening of the optical signal received from the optical line termination OLT. The respective network termination sends the results of the analysis back to the optical line termination OLT which then defines a signaling mode as described above, based on the received results. The transmissions between the optical line termination OLT and the respective network termination in the downstream direction may then be carried out using the defined signaling mode.

As a requirement for carrying out the described procedures, the optical line termination OLT and/or the network terminations NT1, NT2, NT3, NT4, NT5 must be able to generate an optical signal with e.g. 16 different signal states, and to distinguish 16 different signal states of a received optical signal.

Of course, the optical line termination OLT must fulfill this requirement in any case.

However, it is possible that only "new" network terminations are able to fulfill this requirement, whereas "old" network terminations remain to work with only 2 signal states. The address of these "old" network terminations may be stored in the optical line termination OLT so that the number of signal states is held fixed for these "old" network terminations. These "old" network terminations, therefore, do not have to be replaced.

Furthermore, it is possible that in the downstream direction at least the address, in particular the header of the address, of any frame is always sent with only 2 signal states. This ensures that any one of the network terminations, i.e. "old" ones and "new" ones", are able to read the received address or header correctly.

As well it is possible that the described number of signal states is only introduced in one of the two transmission directions, e.g. in the upstream direction. Then, the network terminations must only be able to generate an optical signal with e.g. 16 different signal states. However, the receivers of the network terminations do not need to be able to detect the 16 signal states of a received optical signal. The receiver of the optical line termination OLT, of course, must be able to distinguish between different signal states of the received optical signal. This requirement, therefore, is only necessary once within the optical line termination OLT but not within the network terminations.

Furthermore, it is possible that—prior to the above described procedures—the signal states between the optical line termination OLT and the network terminations are calibrated using so-called preambles. This calibration of the signal states may as well be carried out any time when a new network termination is incorporated into the passive optical network PON. Furthermore, any preamble sent in the upstream direction may be used for the described calibration and to inform the optical line termination OLT about the possible number of signal states of the sending network termination.

The invention claimed is:

1. A method of operating a passive optical network comprising an optical line termination being connected via a plurality of optical fibers to a plurality of network terminations and comprising the step of generating an optical signal for transmission over one of the plurality of optical fibers, the optical signal including a plurality of signal states, each signal state corresponding to a different sequence of bits, wherein the plurality of signal states and the number of bits in each sequence are increased based on a transmission quality of the optical signal on the one of the plurality of optical fibers.

2. The method of claim 1, wherein the transmission quality of the optical signal is an optical power of the optical signal of the one of the plurality of optical fibers.

3. The method of claim 1, wherein the transmission quality of the optical signal is at least one of an error rate, error ratio and an eye opening of the optical signal of the one of the plurality of optical fibers.

4. The method of claim 1, wherein the optical signal corresponds to a specific frame.

5. The method of claim 4, wherein the specific frame corresponds to one of the network terminations.

6. The method of claim 1, wherein for at least one of an upstream direction and downstream direction, the plurality of signal states is forwarded to at least one of the network terminations.

7. The method of claim 1, wherein for at least one of an upstream direction and downstream direction, the plurality of signal states is defined for any one of the network terminations.

8. The method of claim 1, wherein an optical power of the optical signal of the one of the plurality of optical fibers is evaluated for a specific frame, wherein the plurality of signal states is defined based on the evaluated optical power, and wherein the defined plurality of signal states is assigned to that network termination from which the received frame was sent.

9. The method of claim 8, wherein a network termination from which the received frame was sent, is informed about the defined plurality of signal states.

10. The method of claim 1, wherein the plurality of signal states is decreased based on the transmission quality of the optical signal of the one of the plurality of optical fibers.

11. A passive optical network comprising an optical line termination being connected via a plurality of optical fibers to a plurality of network terminations wherein the optical line termination is configured to generate an optical signal including a plurality of signal states, each signal state corresponding to a different sequence of bits, wherein the plurality of signal states and the number of bits in each sequence are increased based on a transmission quality of the optical signal of the one of the plurality of optical fibers.

12. The passive optical network of claim 11, wherein the plurality of signal states is decreased based on the transmission quality of the optical signal of the one of the plurality of optical fibers.

13. The passive optical network of claim 11, wherein the transmission quality of the optical signal is an optical power of the optical signal of the one of the plurality of optical fibers.

14. The passive optical network of claim 11, wherein the transmission quality of the optical signal is at least one of an error rate, error ratio and an eye opening of the optical signal of the one of the plurality of optical fibers.

15. An optical line termination being part of a passive optical network comprising said optical line termination being connected via a plurality of optical fibers to a plurality of network terminations wherein the optical line termination is configured to generate an optical signal including a plurality of signal states, each signal state corresponding to a different sequence of bits, wherein the plurality of signal states and the number of bits in each sequence are increased based on a transmission quality of the optical signal of the one of the plurality of optical fibers.

16. The optical line termination of claim 15, wherein the plurality of signal states is decreased based on the transmission quality of the optical signal of the one of the plurality of optical fibers.

17. The optical line termination of claim 15, wherein the transmission quality of the optical signal is an optical power of the optical signal of the one of the plurality of optical fibers.

18. A network termination being part of a passive optical network comprising an optical line termination being connected via a plurality of optical fibers to a plurality of network terminations wherein the network termination is configured to receive an optical signal including a plurality of signal states, each signal state corresponding to a different sequence of bits, wherein the plurality of signal states and the number of bits in each sequence are increased to a number of signal states that is greater than two based on a transmission quality of the optical signal of the one of the plurality of optical fibers.

19. The network termination of claim 18, wherein the plurality of signal states is decreased based on the transmission quality of the optical signal of the one of the plurality of optical fibers.

20. The network termination of claim 18, wherein the transmission quality of the optical signal is an optical power of the optical signal of the one of the plurality of optical fibers.

* * * * *